July 25, 1961
R. W. DEVLIN
2,993,218
BOLT AND NUT ASSEMBLING METHOD AND APPARATUS
Filed Nov. 10, 1958
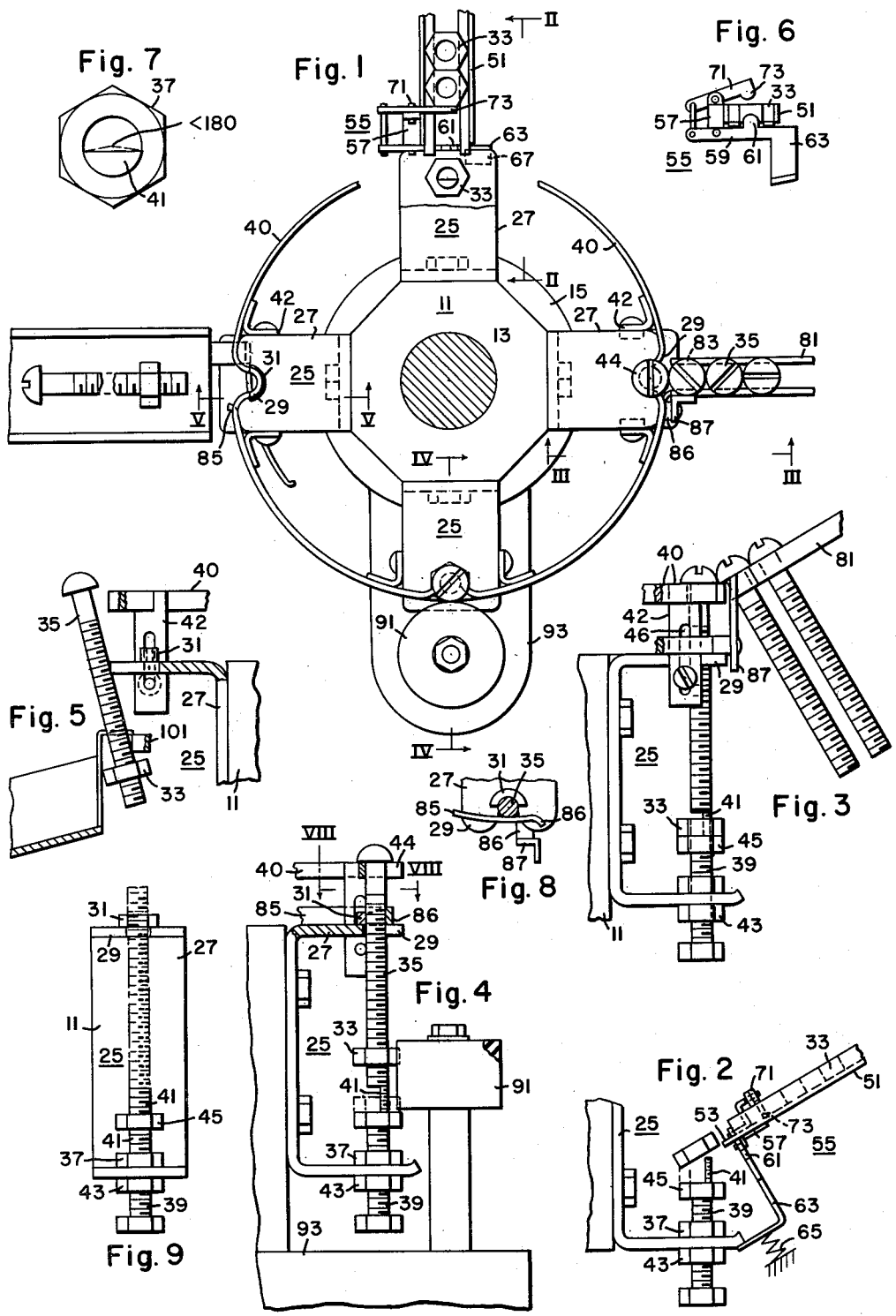

2,993,218
BOLT AND NUT ASSEMBLING METHOD AND APPARATUS
Robert W. Devlin, 5056 Cherryvale Drive, Pittsburgh, Pa.
Filed Nov. 10, 1958, Ser. No. 772,852
6 Claims. (Cl. 10—155)

This invention relates to the automation art and has particular relationship to the assembly of bolts and nuts in pairs with each nut screwed onto the associated bolt.

Many of the large consumers of nuts and bolts require that this hardware be delivered in assembled pairs with the nut screwed onto the associated bolt. This assembly of the nuts and bolts has for many years been carried out by hand. Since the pairs are assembled in large quantities the labor cost for this hand operation is high and attempts have repeatedly been made to provide apparatus for assembling the pairs of nuts and bolts automatically. Typical of such attempts is the Swanson Patent 1,440,646. The practice in accordance with this patent is to cause the tip of the bolt to engage the nut and to then rotate the bolt while holding the nut against rotation.

Such attempts to assemble pairs of nuts and bolts automatically have up to the present proved unsuccessful. When a bolt is rotated with its tip in contact with a nut, cross-threading often occurs and many of the nuts or bolts are damaged.

It is then an object of this invention to provide apparatus and a method for automatically assembling nut-and-bolt pairs and particularly such apparatus and method, the use and practice of which shall not result in cross threading.

Another object of this invention is to provide a fixture for nutting-on apparatus in the use of which nut-and-bolt pairs shall be automatically assembled without cross threading.

A more general object of this invention is to provide apparatus and a method for automatically assembling nut-and-bolt pairs which shall not have the deficiencies of the earlier unsuccessful attempts.

This invention arises from the realization that the successful assembly of a nut and a bolt requires that at the start of the mating together of the threads the part of the bolt where the bolt-thread runs out must coincide with the part of the nut where the nut-thread runs out. At the instant of the nutting-on operation when the bolt is started to turn relative to the nut or the nut is started to turn relative to the bolt the nut and the bolt must have predetermined angular positions so that the regions where the threads of both runs out coincide. In the light of this requirement attempts to assemble a nut-and-bolt combination with the nut in any random angular position relative to the bolt cannot be practically successful.

In accordance with this invention preparatory to the assembly, the bolt of each pair is engaged with an internal thread and the nut with an external thread separated from but coextensive with the internal thread. The external and internal threads are so related that if the external thread were extended to the internal thread it would mate with the internal thread. Thus, the bolt engaged with the internal thread has an angular and axial position such as to mate with the thread of the nut on the external thread. The bolt may be set with its tip a small distance from the nut. In assembling the combination the nut is rotated on the external thread sufficiently to engage the bolt. Since the bolt thread is in effect a continuation of the external thread the nut is screwed onto the bolt when it is rotated. Because of this proper relative angular and axial positioning of the bolt and nut cross-threading is avoided.

The novel features considered characteristic of this invention are disclosed generally above. The invention itself both as to its organization and as to its method of operation, together with additional objects and advantages thereof, will be understood from the following description of a specific embodiment when read in connection with the accompanying drawings, in which:

FIGURE 1 is a view partly in section and partly in top elevation of an embodiment of this invention;

FIG. 2 is a view in side elevation of the upper portion (referred to in FIG. 1) of the apparatus shown in FIG. 1;

FIG. 3 is a view in side elevation of the right-hand portion (referred to FIG. 1) of the apparatus shown in FIG. 1;

FIG. 4 is a view in side elevation of the lower portion (referred to FIG. 1) of the apparatus shown in FIG. 1;

FIG. 5 is a view in side elevation of the left-hand portion (referred to FIG. 1) of the apparatus shown in FIG. 1;

FIG. 6 is a view partly in section and partly in side elevation of the mechanism for controlling the feeding of nuts in the apparatus shown in FIG. 1;

FIG. 7 is a view in top elevation of the nut receiving mechanism of the apparatus;

FIG. 8 is a view in section taken along line VIII—VIII of FIG. 4; and

FIG. 9 is a diagrammatic view illustrating an important feature of this invention.

The apparatus shown in the drawings includes a supporting platform 11 mounted to rotate with a vertical shaft 13 on which it is supported. The shaft 13 carries a gear 15 through which it is indexed from a driving mechanism (not shown) which may include a geneva movement or like device for producing the indexing. While indexing is disclosed as the perferred operation of the shaft 15, it is within the scope of this invention to rotate the shaft 13 continuously.

The platform 11 may be of generally polygonal transverse section providing a plurality of plane vertical surfaces from which fixtures 25 as shown in detail in FIGS. 2, 3, 4, 5, 7, 8 and 9 are suspended.

Each fixture 25 includes a bracket 27 of generally C section. Each bracket 27 is secured with its web vertically from an associated plane surface of the platform 11. The upper arm of each bracket 27 has a groove 29 at its outer end. A segment 31 (FIG. 4) of a nut having the same thread as the nuts 33 to be assembled on the bolts 35 is mounted on the upper arm with the thread of the segmented nut extending over the edge of the boundary of the groove 29.

A nut 37 (FIG. 2) is mounted about an opening in the lower arm of the bracket 27. The opening and the nut 37 are coaxial with the segmented nut 31. The thread in the nut 37 is the same as the threads of the nuts 33. A bolt 39 having a section of its tip milled away to form a spigot 41 is screwed into the nut 37 and locked in a set position by a lock-nut 43. The spigot 41 should subtend an angle of less then 180° (see FIG. 7). The bolt 39 has the same thread as the bolts 35 on which nuts 33 are to be assembled. Just below the spigot a nut 45 which serves as a stop is secured to the bolt 39.

The segmented nut 31 and the bolt 39 are composed of hard steel and are so angularly positioned that if the bolt 39 were extended through the nut 31, the thread of the bolt 39 would mate with the thread of the nut 31. The relationship is shown in FIG. 9 in which the hypothetical part of bolt 39 between spigot 41 and the nut 31 is shown in broken lines.

The bolt 39 and the nut 31 may be preset as follows:

The segmented nut 31 is secured to, or constructed as an integral part of, the bracket 27. A prepositioning bolt having a thread of the same pitch and diameter as the bolts 35 and having a nut screwed onto its lower end is screwed into, or mated with, the segmented nut 31. The thread of this prepositioning bolt is of sufficient length to extend from the segmented nut 31 through the opening in the lower arm of the bracket 27. The nut on this prepositioning bolt is turned until it is in engagement with the lower arm and is then secured to the lower arm and becomes the nut 37. The prepositioning bolt is then removed and the bolt 39 screwed into the nut 37 and thereafter the nut 45 is secured just below the spigot 41. The bolt 39 may then be screwed in until the tip of the spigot 41 is at the desired height and the lock-nut 43 locked into place.

Once a fixture 25 as just described is produced other like fixtures may be produced as tools by relating the thread of the segmented nut 31 and of the bolt 39 properly to the planes of the arms of the bracket 27 or by precision casting.

A generally circular strip 40 mounted on brackets 42 secured to the edges of C-brackets 27 extends above the C-brackets 27. The strip 40 has grooves 44 (FIG. 4) coextensive with the grooves 29 in the C-brackets 27 so that a bolt 35 may be suspended with its head in a groove 44, its thread engaging the thread of a half-nut 31 and its tip a short distance above spigot 41. The brackets 42 have a slot 46 so that the strip 40 may be supported at different heights from the C-brackets 27 to accommodate bolts 35 of different lengths.

The nuts 33 are supplied by gravity along an inclined chute 51 which has a tip 53. (FIG. 2). The tip of a spigot 41, of a fixture 25, stops during each indexing operation near the position where the tip 53 terminates. The tip 53 is so positioned that a nut 33 sliding down the chute 51 is fed onto the spigot 41 and rests on nut 45. The angle subtended by the spigot 41 must permit the nut to slip readily over the spigot and rest flush on the nut 45. The angle subtended by the spigot 41 must be sufficiently large to assure adequate support for the nut 33 when the latter is rotated and screwed onto the bolt 35.

A mechanism 55 (FIG. 6) for assuring that the nuts 33 are supplied one at a time to the spigot 41 is mounted on the chute 51 just above the tip 53. This mechanism includes a bracket 57 secured to one side of the chute 51. An arm 59 having a pin 61 extending in one direction near its center and projections 63 at right angles near its end is pivotally mounted on the bracket 57. The arm 59 is urged by a spring 65 to a position such that the pin 61 is in the opening of the leading nut 33 on the chute 51. The action of the spring 65 may be counteracted by a cam 67 (FIG. 1) carried by the upper arm of each bracket 27 as the bracket 27 arrives in its rest position with the spigot 41 near the tip 53. The arm 59 is thereby pivoted so that the pin 61 releases the leading nut 33 to be fed onto the spigot 41.

The arm 59 is linked to an oppositely disposed arm 71 pivoted at the end of bracket 57 remote from arm 59. The arm 71 carries a pin or projection 73 near its end. When the arm 59 is pivoted to release the leading nut 33 to be fed onto the spigot 41, the pin 73 is pivoted in the path of the next nut 33. When the bracket 27 arrives at its ultimate stop position the cam releases arm 59. The return of arm 59 causes arm 71 to release the nut which it has been holding and the nut drops on pin 61 as arm 59 returns to its set position.

The bolts 35 are delivered under gravity through a chute 81 displaced by 90° around the strip 40 from the chute 51. The chute 81 is so positioned that during the indexing, the strip 40 stops with its groove 44 opposite the delivery end of the chute. The leading bolt in the chute 81 may then drop into groove 44 with its head engaging the top of groove 44, its thread adjacent the thread of the half-nut 31 and its tip a short distance above the spigot 41. While the apparatus is being indexed the strip 40 prevents the next bolt from dropping out of the chute 81 until this bolt enters the next slot 44.

A semicircular spring 85 (FIGS. 1 and 4) cooperates with the bracket 27 to hold each bolt 35 in engagement with the thread of segmented nut 31 during its advance from the position where the bolt 35 leaves the chute 81 to the position where it is removed from the fixture 25. The spring 85 is flared at the ends 86. The flare 86 of the spring is on the side of the bolt 35 away from the nut 31. When the fixture 25 is carried around during each indexing operation following the insertion of a bolt 35 in slot 44, the inserted bolt 35 slides along the flare and is urged by the spring towards the nut 31 so that its thread engages and mates with the thread of the nut 31. The bolt 35 is held in this engaged position by the spring 85.

Each bolt 35 is held by the spring 85 and the thread of nut 31 with its tip a short distance above the tip of a spigot 41 as it is advanced from the right-hand position (FIG. 1). The associated nut 33 is screwed into the bolt 35 by rotating the nut on the spigot 41 so that it advances from the thread on the spigot to the thread on the bolt 35. This is accomplished by a roller 91 of rubber, nylon or other suitable flexible material which engages the nut 33 on the spigot 41. The roller 91 is mounted on a bracket 93 with its axis vertically in a position such as to engage the nut 33 when the fixture 25 reaches a position 90° from the position where the bolts 35 are fed to the fixture, and to urge the thread of the nut 33 resiliently towards the thread on the spigot 41. The resilience of the roller 91 causes the thread of the nut 33 to mate with the thread of spigot 41. The roller 91 may be rotated continuously from the motor which drives the shaft 13. As the roller 91 rotates it rotates the nut 33 and the latter moves from engagement with the thread on the spigot 41 to engagement with the thread of the bolt 35. The spacing of the tip of the bolt 35 and the tip of the spigot 41 must be such that the thread of the nut 33 bridges the threads of the spigot and bolt as it travels from the spigot to the bolt.

To remove the nut-bolt assemblies the apparatus is provided with a resilient finger 101. This finger 101 is mounted so as to penetrate between the arms of the bracket 27 and project a nut-bolt assembly outwardly along the flare 86 as the fixture 25 is indexed to a position 90° from the roller 91.

Assemblies of nuts and bolts are thus produced by the apparatus as it is indexed around.

While a preferred embodiment of this invention has been disclosed herein many modifications thereof are feasible. The invention then is not to be restricted except as is necessitated by the spirit of the prior art.

I claim as my invention:

1. The method of assembling a combination of a nut and a bolt, the bolt having a thread mating with the thread of said nut, the said method comprising engaging the thread of said nut with first mating thread means, subtending an angle of less than 180°, engaging the thread of said bolt with second mating thread means displaced from but coextensive with said first means so that if said first mating thread means were extended it would engage and mate with said second mating thread means, said second thread means subtending an angle such as to permit lateral insertion of said bolt to cause the thread of said bolt to engage said second thread means, the end of said bolt which is to receive said nut when said bolt and nut are so engaged extending a predetermined distance less than the height of said nut from the adjacent end of first thread means, and producing relative rotation of said bolt and nut to produce relative translational movement of said bolt and nut over a second distance greater than said predetermined distance so that the thread of said nut engages and mates with the thread of said first mating thread means, said second distance being such that said nut is moved completely off said bolt.

2. The method of assembling a combination of a nut and a bolt, the bolt having a thread mating with the thread of said nut, the said method comprising engaging the thread of said nut with first mating thread means, subtending an angle of less than 180°, engaging the thread of said bolt with second mating thread means displaced from but coextensive with said first means so that if said first mating thread means were extended it would engage and mate with said second mating thread means, said second thread means subtending an angle such as to permit lateral insertion of said bolt to cause the thread of said bolt to engage said second thread means, the end of said bolt which is to receive said nut when said bolt and nut are so engaged extending a predetermined distance less than the height of said nut from the adjacent end of first thread means, and rotating said nut to cause said nut to traverse a second distance greater than said predetermined distance so that the thread of said nut engages and mates with the thread of said first mating thread means, said second distance being such that said nut is moved completely off said bolt.

3. The method of assembling a combination of a nut and a bolt, the bolt having a thread mating with the thread of said nut, the said method comprising engaging the thread of said nut with first mating thread means, subtending an angle of less than 180°, engaging the thread of said bolt with second mating thread means displaced from but coextensive with said first means so that if said first mating thread means were extended it would engage and mate with said second mating thread means, said second thread means subtending an angle such as to permit lateral insertion of said bolt to cause the thread of said bolt to engage said second thread means, the end of said bolt which is to receive said nut when said bolt and nut are so engaged extending a predetermined distance less than the height of said nut from the adjacent end of first thread means, and rotating said nut to cause said nut to traverse a second distance greater than said predetermined distance so that said nut first engages both said first thread means and the thread of said bolt and thereafter engages only the thread of said first mating thread means, said second distance being such that said nut is moved completely off said bolt.

4. The method of assembling a combination of a nut and a bolt, the bolt having a thread mating with the thread of said nut, the said method comprising engaging the thread of said nut with first mating thread means, subtending an angle of less than 180°, engaging the thread of said bolt with second mating thread means displaced from but coextensive with said first means so that if said first mating thread means were extended it would engage and mate with said second mating thread means, said second thread means subtending an angle such as to permit lateral insertion of said bolt to cause the thread of said bolt to engage said second thread means, and producing relative rotation of said bolt and nut to produce relative translational movement of said bolt and nut so that the thread of said nut becomes separated from said first thread means and engages and mates with the thread of said bolt.

5. Apparatus for assembling combinations of nuts and bolts, each said bolt having a thread mating with the threads of a nut, comprising bolt receiving means, said bolt receiving means having bolt engaging means including a first thread subtending an angle of less than 180° and adapted to mate with the thread of said bolts and said bolt receiving means being formed to permit successive bolts readily to move into mating engagement with said first thread during a continuous assembly operation, nut receiving means, said nut receiving means having nut engaging means including a second thread subtending an angle of less than 180° and adapted to mate with the thread of said nuts and said nut receiving means being formed to permit successive nuts readily to move into mating engagement with said second thread during a continuous assembly operation, means mounting said nut receiving means and said bolt receiving means separated but coextensively so that said second thread if extended would mate with said first thread, first means cooperative with said bolt receiving means for injecting said bolts in succession laterally into said bolt receiving means so that the thread of each bolt as it is injected is engaged in mating engagement with said first thread, second means cooperative with said nut receiving means for feeding said nuts in succession over said second thread of said nut receiving means so that the thread of each nut as it encircles said second thread is engaged in mating engagement with said second thread, cooperation of said first and second means producing a bolt-nut pair with the end of said bolt of said pair on which said nut of said pair is to be screwed spaced a predetermined distance from said nut of said pair, and third means cooperative with said nut receiving means for rotating the nut of said pair so that it advances along said second thread towards the bolt of said pair, said distance being such that said nut of said pair is screwed onto the bolt of said pair.

6. A fixture for nutting-on apparatus comprising a segment of a nut extending over a circumferential angle of less than 180°, a longitudinal member having a threaded spigot extending over a circumferential angle of less than 180°, the thread of said spigot mating the thread of said nut, and means mounting said segment and member separated but coextensively with said spigot towards said nut, said segment and member being so mounted that if said member were extended through said nut with said extended portion having a thread which is a continuation of the thread of said spigot, the thread of said extended part of said member passing through said segment would be in mating engagement with the thread of said segment.

References Cited in the file of this patent

UNITED STATES PATENTS

| | | |
|---|---|---|
| 1,134,092 | Bahr | Apr. 6, 1915 |
| 1,270,021 | Delehanty | June 18, 1918 |